(12) United States Patent
Jones

(10) Patent No.: US 6,435,781 B1
(45) Date of Patent: Aug. 20, 2002

(54) TEMPLATE GUIDE FOR CENTERING DRILL IN REMOVING OF BROKEN STUD

(76) Inventor: Stanley R. Jones, 2405 W. Graff Dr., Payson, AZ (US) 85541

(*) Notice: Subject to any disclaimer, the term of this patent is extended or adjusted under 35 U.S.C. 154(b) by 0 days.

(21) Appl. No.: 09/956,814

(22) Filed: Sep. 21, 2001

Related U.S. Application Data

(60) Provisional application No. 60/271,728, filed on Feb. 28, 2001.

(51) Int. Cl.⁷ .............................................. B23B 49/02
(52) U.S. Cl. ..................... 408/1 R; 408/97; 408/115 R; 29/426.4
(58) Field of Search ...................... 408/1 R, 97, 115 R, 408/115 B, 241 B, 84; 29/426.4, 402.03, 402.08

(56) References Cited

U.S. PATENT DOCUMENTS

| | | | |
|---|---|---|---|
| 2,008,436 A | | 7/1935 | Cross |
| 2,651,951 A | | 9/1953 | Altenburger |
| 3,148,562 A | * | 9/1964 | Moss ........................ 33/628 |
| 3,204,493 A | | 9/1965 | Severdia |
| 3,363,488 A | * | 1/1968 | Thau et al. ................ 29/426.4 |
| 3,713,747 A | * | 1/1973 | Haselmo ................. 408/115 R |
| 3,810,710 A | * | 5/1974 | Ennemoser ................. 408/111 |
| 4,544,307 A | | 10/1985 | Miller |
| 4,733,996 A | * | 3/1988 | Catapano ................ 408/115 R |
| 4,759,666 A | | 7/1988 | Grab |
| 4,969,245 A | | 11/1990 | Gevas |
| 5,388,933 A | | 2/1995 | Dunbar |
| 5,415,502 A | | 5/1995 | Dahlin |
| 5,544,987 A | | 8/1996 | Gipson |
| 5,546,834 A | | 8/1996 | Gable |
| 5,988,955 A | | 11/1999 | Curtis |
| 6,109,839 A | * | 8/2000 | Thomas ....................... 33/562 |
| H1887 H | * | 10/2000 | Fuller ........................ 408/103 |

FOREIGN PATENT DOCUMENTS

GB 548812 10/1942

* cited by examiner

Primary Examiner—Daniel W. Howell
(74) Attorney, Agent, or Firm—Richard C. Litman

(57) ABSTRACT

A template guide and method of using the template for removing broken studs on a vehicle hub. The arcuate template guide has three apertures for placement on a hub over the broken stud and two neighboring studs, the template being secured by lug nuts on the neighboring studs. A metal bushing is inserted in the center aperture and has a hole having a diameter slightly larger than the diameter of a drill bit used for forming a hole in the broken stud face with a drill in order to guide the drill bit. An extraction tool with a left-hand spiral tip and a squared rear end is utilized with a tap wrench to extract the broken stud from the hub. The template guides may be provided in a kit of up to eight common sizes.

7 Claims, 3 Drawing Sheets

TEMPLATE GUIDE FOR CENTERING DRILL IN REMOVING OF BROKEN STUD

CROSS-REFERENCE TO RELATED APPLICATION

This application claims the benefit of U.S. Provisional Patent Application Serial No. 60/271,728, filed Feb. 28, 2001.

BACKGROUND OF THE INVENTION

1. Field of the Invention

The present invention relates generally to devices for removing wheel studs. More specifically, the invention is a device for facilitating the removal of a broken stud from a vehicle hub.

2. Description of Related Art

The related art describes various tools and aids for removing broken studs from a hub, but none describes the present invention. There is a need for a simplified tool system for removing broken studs from hubs. The broken stud, if long, can be gripped by a hand tool and removed, but if short must have its sharp end flattened by grinding before attempting to drill a hole. Even then, the drilling procedure can damage the internal threading in the hub. It is difficult to keep the drill bit centered in order to drill a hole in the stud for insertion of an extractor. The present invention removes such problems. The related art will be discussed in the order of perceived relevance to the present invention.

U.S. Pat. No. 5,388,933 issued on Feb. 14, 1995, to David Dunbar describes a tool for centering a punch or drill on a stud's broken face. For extracting a broken stud from an engine block without removing the covering exhaust manifold piece, a hexagonal nut is turned on a threaded shaft having a throughbore and a narrowed conical front portion which expands a polyurethane sleeve inserted in the bore of the manifold to fix the shaft in the manifold. A drill or center punch is inserted in the shaft to make a hole in the broken stud's face for extraction by a screw extractor which was not identified further. The tool is distinguishable for requiring a threaded shaft with a throughbore screwed inside a hexagonal nut to expand a polyethylene sleeve.

U.S. Pat. No. 5,988,955 issued on Nov. 23, 1999, to John M. Curtis describes a lug nut taper trueing tool for racing automobile wheels to eliminate the irregular and inconsistent stamped holes in racing wheels. A wheel is clamped between two disks, wherein the top disk has five holes with steel bushings having a bottom flange and held in place by set screws. A cutting tool with a manual or machine driven cutting tool having a guide pin and an inclined carbide cutting edge is inserted from the side opposite the top disk to form a true lug nut taper. The tool and method is distinguishable for requiring a flanged steel bushing which must be secured by a set screw and the use of a pin guided cutting tool to form a bevelled edge in a lug nut hole.

Gt. Britain Patent Application No. 548,812 published on Oct. 26, 1942, for Charles E. Wurr describes a jig for facilitating drilling or punching operations by utilizing metal or synthetic resinous split or integral bushings as locating bushings having a thickness of 0.02 to 0.03 inch in either a planar metal or resinous jig. The jig is distinguishable for its irregular pattern of multiple holes and the use of split bushings.

U.S. Pat. No. 5,415,502 issued on May 16, 1995, to Bernard A. Dahlin describes a drill and tap guide comprising a block having an assortment of guide holes having different diameters to guide a drill or tap into the workpiece. The guide is distinguishable for requiring an assortment of guide holes having different diameters and lacking a bushing.

U.S. Pat. No. 5,544,987 issued on Aug. 13, 1996, to Gregory L. Gipson describes a removal tool for broken or seized inner Budd nuts mounted on a stud. The tool is based on a rectangular plate which has three apertures for positioning the plate over three Budd nuts with the damaged Budd nut centered. A pivoting bar is centered over the damaged Budd nut and extends from a pivot post to only one end having an adjusting knob. A drill is inserted into a guide over the damaged Budd nut to break it up. The Budd nut removal tool is distinguishable for requiring a guide plate having a pivoting bar.

U.S. Pat. No. 4,759,666 issued on Jul. 26, 1988, to Joseph J. Grab describes a drill guide for use in drilling a central bore in a portion of a broken-off bolt remaining in a threaded bore. A clamp tube carries inwardly-directed setscrews for attaching the clamp tube to a stud or bolt located near the broken bolt. An arm extends adjustably through the clamp tube, and setscrews in the clamp tube hold the arm in a desired position relative to the clamp tube. A drill guide holder mounted on the arm includes setscrews which hold a drill guide tube in position to receive and guide a drill to bore a hole in the broken bolt. The device is distinguishable for its required clamp tube, arm and drill guide structure.

U.S. Pat. No. 4,544,307 issued on Oct. 1, 1985, to Aaron B. Miller describes a drilling jig for flathead screw li pilot holes comprising a rigid foam plastic casting having three staggered holes with protrusions on the top surface and bevelled edges on the bottom surface. The device is distinguishable for its simplified structure.

U.S. Pat. No. 3,204,493 issued on Sep. 7, 1965, to Anton M. Severdia describes a standardized combination universal drill jig and milling fixture comprising a circular drill jig having provisions for accurately locating in a plurality of positions of adjustment bushings and liners for drilling, tapping, chamfering, counter-boring, spot-facing or reaming tools. The device is distinguishable for its multiplicity of apertures.

U.S. Pat. No. 2,651,951 issued on Sep. 15, 1953, to Herman G. Altenburger describes a universally adaptable drill jig comprising a rectangular plate having rows and columns of apertures. The drill jig is distinguishable for requiring a multiplicity of drilling apertures.

U.S. Pat. No. 2,008,436 issued on Jul. 16, 1935, to Grosvenor M. Cross describes a circular tap starter block comprising radiating ribs having a series of throughbores with increasing diameters. The device is distinguishable for its multiple drilling bores in radiating ribs of the circular block.

U.S. Pat. No. 5,546,834 issued on Aug. 20, 1996, to Jack Gable et al. describes a tool for removing frozen threaded fasteners, such as bud nuts, from studs with external threading without damaging the stud threads. The device has a V-shaped body with two bored flanges for attaching to adjacent studs by bud nuts. The center bore houses a hexagonal cap on a driver element having two sets of threads with different pitch, an engager element engaged with the larger threaded end of the driver element, and a collar sector and stop arrangement for limiting relative motion between the driver element and the engager element. The tool is distinguishable for its required driver and engager elements.

U.S. Pat. No. 4,969,245 issued on Nov. 13, 1990, to James C. Gevas describes a tire wheel mounting aid to reduce the difficulty in tire wheel alignment and mounting in stud/lug nut applications. The apparatus comprises a detachable two-part mount stud extension assembly comprising an extender and an adapter which is screwed onto a mount stud, thus extending the outward extension of the mount stud. The extender is a headed shaft. The adapter is a hollow cylinder having one internally threaded end for mounting on a stud and an opposite end having an extender alignment hole. The apparatus is distinguishable for its different structure.

None of the above inventions and patents, taken either singly or in combination, is seen to describe the instant invention as claimed.

SUMMARY OF THE INVENTION

The present invention is directed to a template guide for centering a drill in a broken stud and a method of removing the broken stud, comprising the utilization of a substantially semicircular template guide having at least three holes for attachment to fit and be secured to the studs on either side of the broken stud with their lug nuts. The template guide has a bushing within the center hole with an inside diameter adapted for guiding a drill bit to form a hole in the broken stud without the fear of damaging the internal threading in the hub hole. An extraction tool called an EASY-OUT® having a left-hand spiral is utilized with the aid of a wrench to remove the drilled broken stud from its hole. A new stud can be inserted without fear of damaging threads in the stud hole.

Since wheel hubs are made in different sizes, the template may be marketed as a kit containing templates of different sizes to accommodate the variety of wheel hubs commonly in use.

Accordingly, it is a principal object of the invention to provide a template guide.

It is another object of the invention to provide a template guide for removing broken studs from a vehicle hub.

It is a further object of the invention to provide a template guide having at least three holes with the center hole having a bushing with a hole having a diameter to guide a drill bit.

Still another object of the invention is to provide a method of removing a broken stud by utilizing a template guide with a bushing, drilling a hole in the broken stud, and removing the broken stud with a tool having a left-hand spiral, tapered point.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
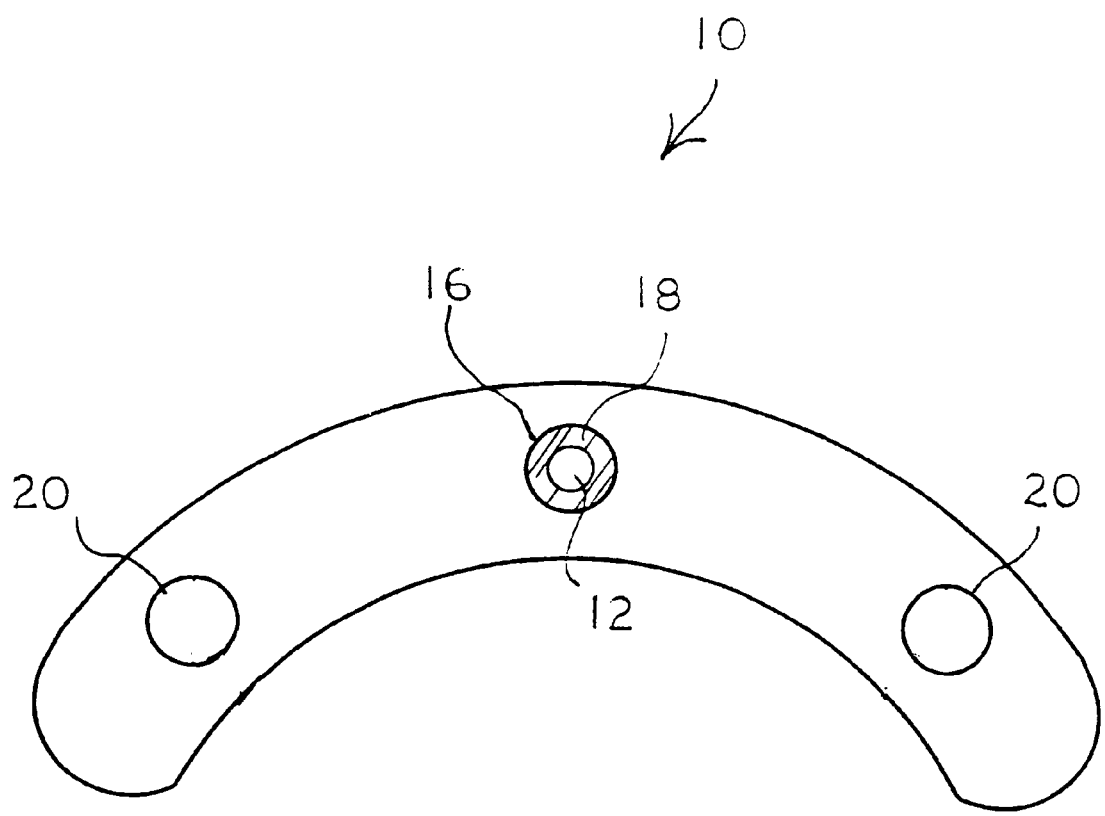
FIG. 1 is a front elevational view of a template guide for removing a broken stud according to the present invention.
Figure 2:
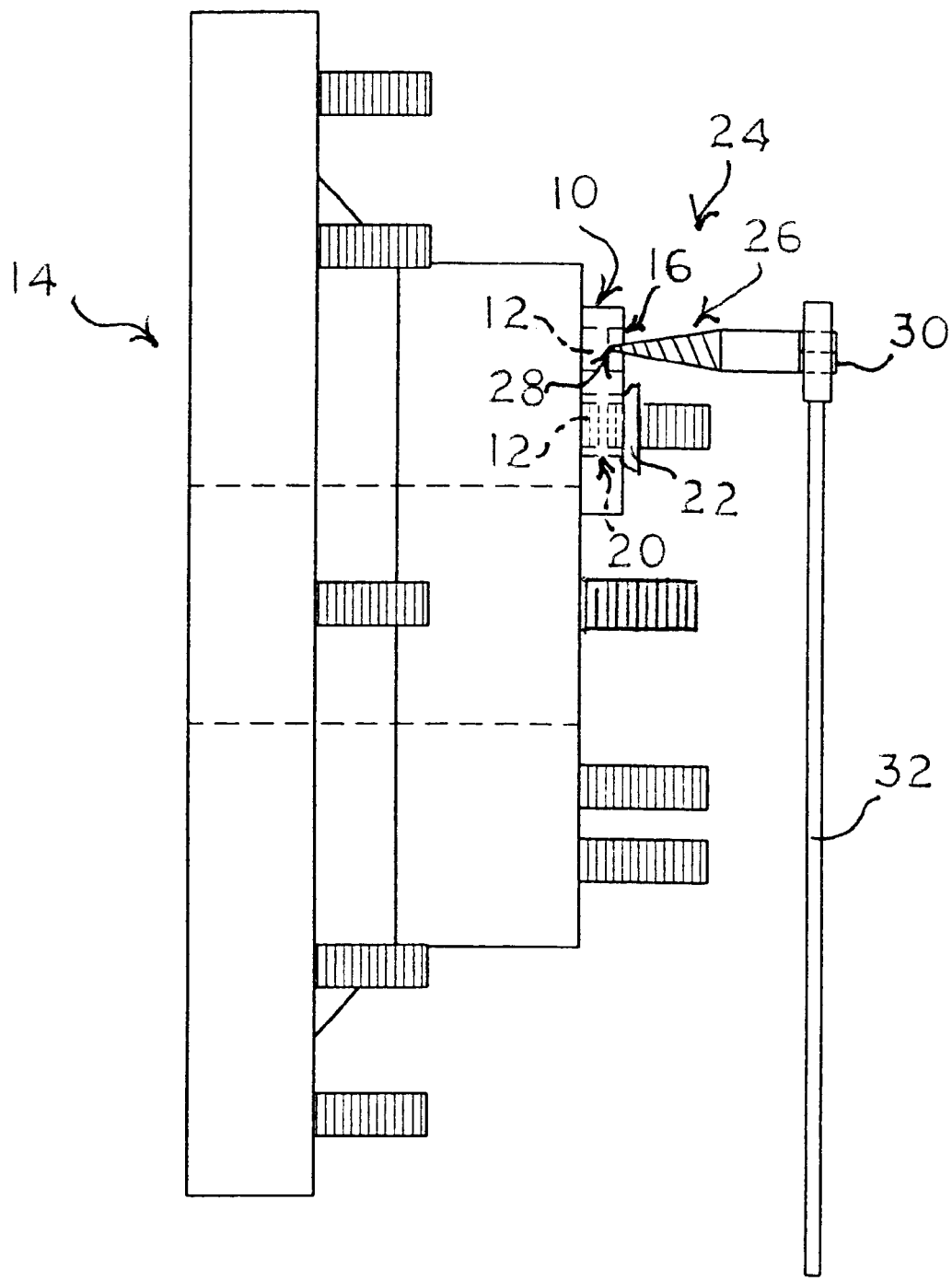
FIG. 2 is an environmental side elevational view of the hub with studs and the drill bushing in the guide with an extraction tool driven by a wrench.
Figure 3:
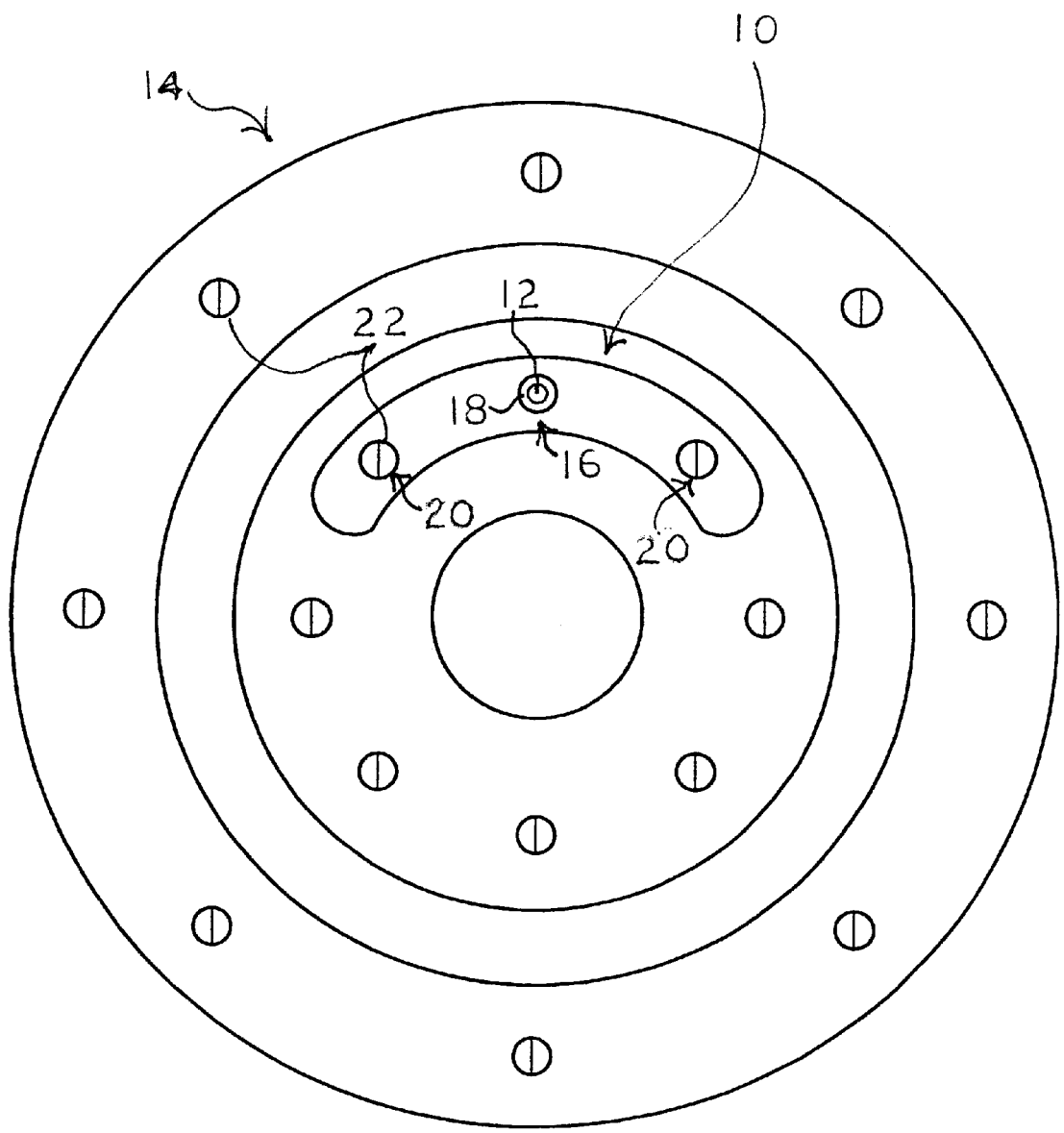
FIG. 3 is an environmental front elevational view of the template guide according to the present invention on a wheel hub.

The present invention is directed to a template guide 10 illustrated in FIGS. 1–3 for centering a drill bit (not shown) in a broken stud 12 of a wheel hub 14. The template guide 10 has a central aperture 16 including a drill guide bushing 18 for guiding the drill bit, and outside apertures 20 for securing the template to a wheel hub or axle flange. The template guide 10 is secured to the hub 14 by placing the template against the hub with the bushing 18 centered above the broken stud and the outside apertures 20 placed over adjacent good studs, and securing the template 10 by lug nuts 22 (FIG. 2). The bushing 18 has an inside diameter adapted for guiding a drill bit (not shown) to form a hole in the broken stud 12. A conventional extraction tool 24, depicted in FIG. 2, called an EASY-OUT® is utilized to remove the drilled broken stud 12 from its threaded hole. The tool 24 has a left-hand spiral cutting portion 26 with sharp edges, a blunt front end 28 and squared rear end 30 for grasping with a tap wrench 32 or the like. As the hardened steel extractor 24 is turned counter-clockwise, the tool enters the broken stud 12 and readily pulls out the broken stud 12 without damaging the internal threading of the hub aperture.

Thus, a method for removing a broken stud 12 in a wheel hub 14 comprises the steps of providing a substantially semicircular template guide 10 to fit the specific hub from the kit having at least three apertures 16, 20 and 20 for attachment to fit and secure to the outside studs with lug nuts 22, the template guide 10 being provided with a metal bushing 18 within the center hole 16 with an inside diameter adapted for guiding a drill bit. Next, drilling a hole centered in the broken stud 12 and inserting an extraction tool 24 with a square rear end 30 and a left-hand spiral cutting portion 26 with sharp edges into the drilled hole, then turning the extraction tool 24 counter-clockwise with a tap wrench 32 or the like to remove the drilled broken stud 12 from its hole.

Since vehicle hubs differ in at least eight sizes, a kit of template guides 10 and extraction tools 24 can be produced to fit the most common sizes of vehicle hubs, the kit containing between two and eight templates 10.

It is to be understood that the present invention is not limited to the sole embodiment described above, but encompasses any and all embodiments within the scope of the following claims.

I claim:

1. A template guide for removing a broken stud from a wheel hub, comprising:

a flat arcuate body having three holes spaced equidistantly in said body, including a center hole and two outside holes on opposite sides of said center hole, the two outside holes being sized and dimensioned for sliding over wheel studs; and a bushing disposed in the center hole;

wherein the template is adapted for attachment to a wheel hub with the two outside holes placed over intact wheel studs and secured by lug nuts with the center hole over a broken stud so that a drill bit can be guided by the bushing in order to drill a hole for a screw extractor in the broken stud for extraction.

2. A template guide according to claim 1, wherein the center hole is located at the midpoint of the arcuate body.

3. A template guide according to claim 1, wherein the three holes disposed in said arcuate body are spaced apart radially by an equal angular distance.

4. A template guide according to claim 1, wherein said template guide is provided in a kit of between two and eight templates of different sizes in order to fit conventional wheel hubs.

5. A template guide according to claim 1, wherein said bushing is made from metal.

6. A method for removing a broken stud in a wheel hub comprising the steps of:
- providing a substantially semicircular template guide having at least three holes spaced apart radially, including a center hole and two outside holes on opposite sides of the center hole, the center hole having a bushing;
- placing the template against a wheel hub with the center hole above a broken stud and the outside holes placed over intact studs;
- securing the template to the wheel hub by installing lug nuts on the intact studs;
- drilling a hole in the broken stud;
- inserting an extraction tool with a square end and a left-hand spiral cutting portion with sharp edges into the drilled hole; and
- turning the extraction tool counter-clockwise with a tap wrench to remove the broken stud from the wheel hub.

7. The method for removing a broken stud in a wheel hub according to claim 6, further comprising the steps of:
- providing a kit containing between two and eight template guides of different sizes; and
- selecting a template guide from said kit sized and dimensioned for fitting onto the wheel hub.

* * * * *